United States Patent
Forster

(10) Patent No.: US 10,365,137 B2
(45) Date of Patent: Jul. 30, 2019

(54) TRANSIT TIME FLOW METER APPARATUS, TRANSDUCER, FLOW METER AND METHOD

(71) Applicant: Titan Enterprises Limited, Sherborne, Dorset (GB)

(72) Inventor: Trevor Forster, Sherborne (GB)

(73) Assignee: Titan Enterprises Limited, Sherborne (GB)

( * ) Notice: Subject to any disclaimer, the term of this patent is extended or adjusted under 35 U.S.C. 154(b) by 155 days.

(21) Appl. No.: 15/543,687

(22) PCT Filed: Jan. 13, 2016

(86) PCT No.: PCT/EP2016/050528
§ 371 (c)(1),
(2) Date: Jul. 14, 2017

(87) PCT Pub. No.: WO2016/113283
PCT Pub. Date: Jul. 21, 2016

(65) Prior Publication Data
US 2018/0216980 A1    Aug. 2, 2018

(30) Foreign Application Priority Data
Jan. 15, 2015   (GB) .................................. 1500673.7

(51) Int. Cl.
*G01F 1/66*   (2006.01)

(52) U.S. Cl.
CPC ................ *G01F 1/662* (2013.01); *G01F 1/66* (2013.01)

(58) Field of Classification Search
CPC ............... G01F 1/66; G01F 1/662; G01P 5/00
See application file for complete search history.

(56) References Cited

U.S. PATENT DOCUMENTS

| | | | |
|---|---|---|---|
| 4,454,767 A * | 6/1984 | Shinkai | G01F 1/662 73/861.18 |
| 5,594,181 A | 1/1997 | Stange | |
| 6,681,642 B2 * | 1/2004 | Ohkawa | G01F 1/662 264/295 |
| 7,270,014 B2 * | 9/2007 | Keese | G01F 1/586 73/861.12 |
| 7,997,149 B1 | 8/2011 | Dam | |
| 8,714,030 B1 * | 5/2014 | Liu | G01F 1/662 73/861.28 |

(Continued)

FOREIGN PATENT DOCUMENTS

| | | |
|---|---|---|
| EP | 0537735 | 4/1993 |
| GB | 2521661 | 7/2015 |
| WO | WO97/24585 | 7/1997 |

*Primary Examiner* — Francis C Gray
(74) *Attorney, Agent, or Firm* — Lightbulb IP, LLC

(57) ABSTRACT

A transit time flow meter apparatus for determining a flow rate of a flowing fluid using a time difference between upstream and downstream acoustic transmissions in the fluid, the flow meter including a pair of segmented transducers to be arranged in spaced relation on a flow tube, wherein respective ones of the segmented transducers include at least two portions, wherein at least one of the two portions is an active transducer portion separated from the or each other portion by one of an expansion gap or gaps, or a deformable element, whereby to enable fluctuations in a flow tube dimension to be accommodated without damage being caused to the active transducer portion.

19 Claims, 6 Drawing Sheets

(56) References Cited

U.S. PATENT DOCUMENTS

| | | |
|---|---|---|
| 2002/0033055 A1 | 3/2002 | Ohkawa |
| 2004/0226386 A1 | 11/2004 | Gysling |
| 2004/0254469 A1 | 12/2004 | Shkarlet |
| 2007/0022824 A1 | 2/2007 | Bailey |
| 2007/0234791 A1* | 10/2007 | Wiest ................. G01F 1/662 |
| | | 73/170.13 |
| 2008/0236297 A1 | 10/2008 | Fleet |
| 2011/0094309 A1 | 4/2011 | Berger |
| 2011/0226063 A1* | 9/2011 | Gysling ................. G01F 1/66 |
| | | 73/623 |
| 2013/0080081 A1* | 3/2013 | Dugger ................. G01F 1/667 |
| | | 702/48 |
| 2015/0020608 A1 | 1/2015 | Chevrier |
| 2015/0160059 A1* | 6/2015 | Le Floch ................. G01F 1/66 |
| | | 73/195 |

\* cited by examiner

TRANSIT TIME FLOW METER APPARATUS, TRANSDUCER, FLOW METER AND METHOD

TECHNICAL FIELD

Aspects relate, in general, to acoustic apparatus and methods for measuring the flow rate of a fluid by measuring propagation times of ultrasonic signals transmitted through the fluid.

BACKGROUND

Ultrasonic transit time flow meters, also known as time of flight ultrasonic flow meters, detect the acoustic propagation time difference between the upstream and downstream ultrasonic transmissions resulting from the movement of a fluid, which may be a liquid or gas for example, flowing through a tube or conduit upon which transducers of the low meter are mounted. The information relating to the transmissions is processed in order to derive a fluid flow rate.

SUMMARY

According to an example, there is provided a transit time flow meter apparatus for determining a flow rate of a flowing fluid using a time difference between upstream and downstream acoustic transmissions in the fluid, the flow meter including a pair of segmented transducers to be arranged in spaced relation on a flow tube, wherein respective ones of the segmented transducers include at least two portions, wherein at least one of the two portions is an active transducer portion separated from the or each other portion by one of an expansion gap or gaps, or a deformable element, whereby to enable fluctuations in a flow tube dimension to be accommodated without damage being caused to the active transducer portion. The at least two portions of at least one of the pairs of segmented transducers are arranged on adjustable arms arranged, whereby to enable accommodation of flow tubes of varying diameter. Respective portions can be so profiled as to match the outer profile of the flow tube. Respective portions can be acoustically coupled to the flow tube. Respective portions can be in the form of segments of a toroid formed using a rectangle or square, or indeed any other shape. Respective ones of the segmented transducers can comprise three portions, the innermost profile of each defining an arc subtending an angle of 120 degrees. Respective portions can be attached to the flow tube using a flexible material, whereby to enable variations in the diameter of the flow tube due to pressure variations in the fluid flowing therein to be accommodated. Respective portions for a transducer can be connected together using a flexible connector. The flexible connector can be electrically conductive. A driving circuit can deliver energising or compensating signals to selected or all portions of a transducer. A detection circuit can process electrical signals generated by a transducers of the flow meter. The flow tube can be formed from a portion of a pipe or conduit within which the fluid flows and upon which the transducers are mounted or otherwise disposed. The flow tube can be integral with the transducers and operable to be connected to an external circuit within which the fluid flows.

According to an example, there is provided a transducer for a flow meter operable to determine a flow rate of a fluid flowing in a flow tube using a time difference between upstream and downstream acoustic transmissions in the fluid, wherein the transducer comprises at least two portions or segments. The at least two portions can be arranged in spaced relation to one another, whereby to provide a gap, break or interruption between the portions. Respective portions can be so profiled (such as at an inner portion thereof) as to match the outer profile of the flow tube. Respective portions can be in the form of segments of a toroid formed using a square or rectangle. The transducer can be a tripartite transducer. The portions can be the same size as one another. One portion of the transducer can be larger than at least one other of the portions. Portions can be spaced from one another by gaps of pre-selected widths. One of the portions can be fabricated from a different material to at least one other of the portions. At least one portion can be a piezoelectric crystal transducer. At least one portion can be formed from a rubber or plastics material. At least one portion can be in the form a wedge or segment. An inner profile of the transducer can be smaller than a corresponding outer profile of a flow tube. The inner profile can be pre-selected in dependence on the use profile of the transducer. Respective portions can be so profiled as to match the outer profile of the flow tube. Respective portions can be acoustically coupled to the flow tube. Respective portions for the transducer can be connected together using a flexible connector. The flexible connector can be electrically conductive.

According to an example, there is provided a flow meter apparatus comprising a pair of transducers as described herein. The pair of transducers can be mechanically fixed together in spaced relation to one another, whereby to enable a pipe or conduit to be provided in the region between the transducers so as to form a flow tube for the apparatus. At least one transducer can include a removable portion whereby to provide an opening in a transducer for introduction of the pipe or conduit. The removable portion can be adapted to be introduced to a gap in the transducer whereby to fix the tube in place within the transducer.

According to an example, there is provided a method for determining a flow rate of a fluid in a conduit, comprising providing a pair of segmented transducers arranged in spaced relation on a flow tube connected to or otherwise forming a part of the conduit, respective ones of the segmented transducers including at least two portions or segments, at least one of the two portions being an active transducer portion separated from the or each other portion by one of an expansion gap or gaps, or a deformable element, whereby to enable fluctuations in a flow tube dimension to be accommodated without damage being caused to the active transducer portion, determining a time difference between upstream and downstream acoustic transmissions from the pair of segmented transducers, and determining a flow rate of a fluid flowing in the flow tube using the time difference. The method can further include providing a wedge as at least one portion in at least one of the segmented transducers.

BRIEF DESCRIPTION OF THE DRAWINGS

Embodiments will now be described, by way of example only, with reference to the accompanying drawings, in which.

DESCRIPTION

Figure 1:
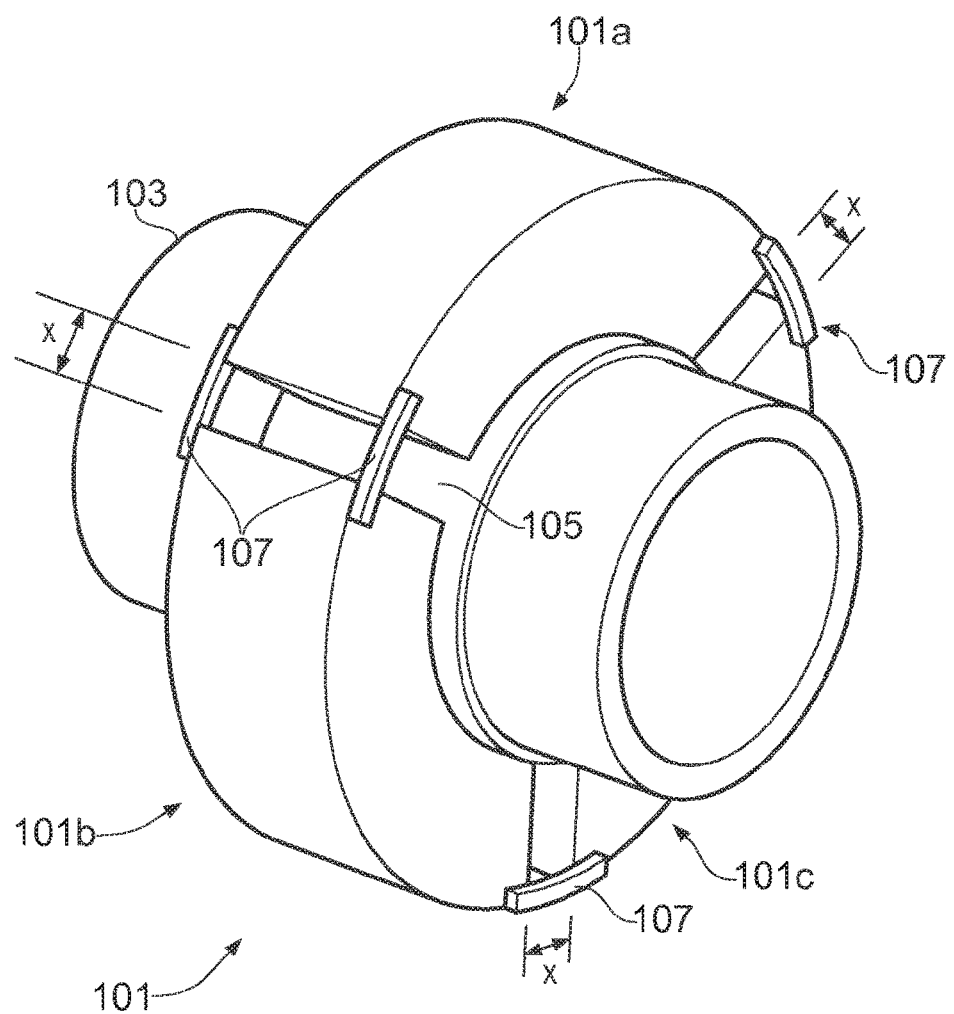
FIG. 1 is a schematic representation of a segmented transducer according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Various types of acoustic flowmeters are known, one of the most versatile being an ultrasonic flowmeter of the transmission, or contra-propagating transit-time differential type. These may be formed in a variety of structural or mechanical arrangements, but all have the common feature that sonic energy, typically at ultrasonic frequencies, is transmitted through a fluid and received by a detector.

Both direct transmission and reflective flow sensors are known. A transit-time differential flowmeter functions by determining the difference between the rate of propagation of the sound energy when flowing with and against a stream of fluid, the flow rate of which is being determined. This is achieved by assessing the difference between the propagation time with and against the fluid flow. The technique has the advantage that besides being reliable and accurate, it can also be used to determine the velocity of sound in the fluid flowing in the flow tubes which, in addition to being required to determine flow, can be used to establish what fluid is present, as the velocity of sound is different in different fluids.

Although it is common for the acoustic energy to be transmitted into the flow of the fluid being measured at an angle to the direction of travel of the fluid, the most consistent and accurate results are achieved by creating a substantially plane wavefront travelling substantially parallel to the direction of fluid flow. For this purpose, one known such flowmeter has transducers at each end of a flow tube and inlet and outlet connectors for the fluid into the sides of the flow tube, the transducers typically comprising piezo-electric transducers or "crystals".

Typically, the transducers are fixed or clamped to a flow tube. For example, transducers can be cemented in place using an acoustic cement to enable acoustic coupling between a transducer and the tube. Transducers can be in the form of toroids, and thus piezo-electric toroidal transducers for example, can be acoustically coupled to a tube to make an ultrasonic flowmeter. When the wavelength of sound produced by such transducers is larger than the diameter of tube, this results in a planar wavefront propagating in the fluid flowing in the tube. However, if the tube expands with temperature or pressure, excessive stress on the assembly may cause the piezo-electric element or the acoustic coupling to fail rendering the fluid velocity measurement either inaccurate or impossible.

Accordingly, in a use scenario in which the pressure or temperature of a fluid within a flow tube fluctuates, such as high pressure hydraulic pipes for example, fixed transducers are susceptible to damage or failure due to fluctuations in the diameter of the flow tube as a result of changes in the pressure and/or temperature of the fluid flowing within it.

According to an example, there is provided a transit time flow sensor for determining a flow rate of a fluid flowing in a flow tube using a time difference between upstream and downstream acoustic transmissions, the sensor comprising a pair of segmented transducers arranged in spaced relation on the flow tube, respective ones of the segmented transducers including at least two portions. In an example, a gap between the portions of a transducer permits independent movement of the portions, thereby enabling the transducer to accommodate fluctuations in pipe dimension due to, for example, pressure variations of the fluid flowing with the tube. In the case that a transducer portion is a crystal segment, the provision of a gap, interruption or break between portions can enable independent movement of the segment which can prevent damage being caused to the segment and/or to an acoustic coupling between the segment and the flow tube to which the segment is associated, coupled or attached.

In an example, each segmented transducer works as a single transducer. That is, respective segments act in unison to form a notional single transducer unit. As will be explained in more detail below, this can be by virtue of an electrical connection between segments, or by way of each segment being electrically isolated but simultaneously activated for example.

In an example, the flow tube can be a dedicated flow tube for the flow sensor (or meter) to which an external circuit may be attached in order to divert a fluid flow so that flow rate can be measured. For example, the transducers may be provided on the flow tube and either end of the flow tube can be attached to respective valves of an external circuit within which a liquid flows in order to divert the fluid flow through the flow tube. This can be temporary until a measurement has been obtained, or the flow meter can remain in place with the valves off so that no liquid flows through the flow tube until it is desired to take a measurement for example. Accordingly, the combination of the flow tube and the transducers form the flow meter.

Alternatively, the flow tube can be part of the circuit within which a fluid flows for which a flow rate measurement is desired. Accordingly, transducers can be applied to a portion of a conduit or pipe to act as the flow tube. The transducers can remain in situ and be fixed for example, or can be releasably attached to the pipe. The transducers as described below can be applied to a flow tube in this manner using mechanical fixing devices, such as straps, clamps and so on, with or without the use of an adhesive or mastic between the transducers and the pipe. Accordingly, the combination of a portion of a pipe acting as the flow tube and the transducers forms the flow meter. Reference to a flow tube therefore includes a dedicated flow tube for a flow meter that can be introduced to an external circuit for flow rate measurements, or a flow tube which is derived, perhaps temporarily, from part of a conduit within which the fluid whose flow rate is desired flows. In either case, a transducer according to an example is provided to transmit an annular ultrasound signal into the tube, and which can cope with the demands of being mounted, fixed or otherwise disposed on a tube the dimensions of which may vary as a result of fluctuations in the pressure and/or temperature of the liquid flowing within the tube.

According to an example, a flow tube can be a small tube such as one with a diameter that is less than 25 mm. A segmented transducer in use with such a flow tube oscillates radially at a frequency greater than the wavelength of sound in a fluid flowing within the tube, thereby causes a plane wave to be transmitted down the tube which broadly speaking integrates the fluid velocities.

In an example, a three segment transducer can accommodate a range of flexible tubes varying in diameter by up to 50%. For example, a three part sensor could accommodate tubes with an outside diameter from 2.7 to 4 mm, 4 to 6 mm, 6 to 9 mm and so on. This is a much greater range than any previous technology and means fewer sensor assemblies for a range of tube sizes.

FIG. 1 is a schematic representation of a segmented transducer according to an example. A transducer 101 is acoustically coupled to a flow tube 103 (only part of which is depicted in FIG. 1). In the example of FIG. 1, an acoustic coupling material 105 is depicted between the transducer 101 and the tube 103. The use of an acoustic coupling material can help avoid any air gaps between the transducer and the tube which will degrade the signal produced by the transducer. This material can be an adhesive for example, to provide an acoustic coupling to the tube 103, or can be a mastic or plastic material.

Transducer 101 in the example of FIG. 1 is tri-partite, and comprises three transducer portions, 101a-c. The portions 101a-c thus form three parts of the transducer 101 and each portion is separated from another portion by a gap. The three parts, or portions/segments are, in the example of FIG. 1, active segments inasmuch as each portion can be energised (simultaneously, in unison or separately) and can transduce a received signal, such as a received ultrasound signal, to an electrical signal (and vice versa).

In the example of FIG. 1 the gaps between segments of the transducer are of the same width, namely x, however the width of the gaps may be different. The width of a gap between portions may be anywhere from, for example, the order of 0.1 mm to the order of several millimeters, although it will be appreciated that any particular width may be used accordingly to the nature of application.

The flow tube 103 and the segments 101a-c may be held in contact with one another by connection means (not shown) operable to apply a mechanical force between the transducer segments and the flow tube. Such a connection means can include a band or clamp and so on which can go around the segments of the transducer and grip them and the flow tube together. In an example, the connection means can be removable to enable the transducer to be moved or removed.

Flexible connections 107 join the assembly together to form a single toroidally shaped transducer around the tube. In an example, the connections can be electrically conductive and coupled to a driving module (and/or a detection module), and thus each part or segment 101a-c can be excited simultaneously to provide an ultrasonic wave that can propagate through a liquid or gas flowing within tube 103. According to an example, the provision of the gaps between segments, and the flexible connections 107 enables the segments of the transducer to move or flex with the pipe 103 without breaking whilst still enabling them to transmit an annular ultrasound signal into the tube 103.

Figure 2:
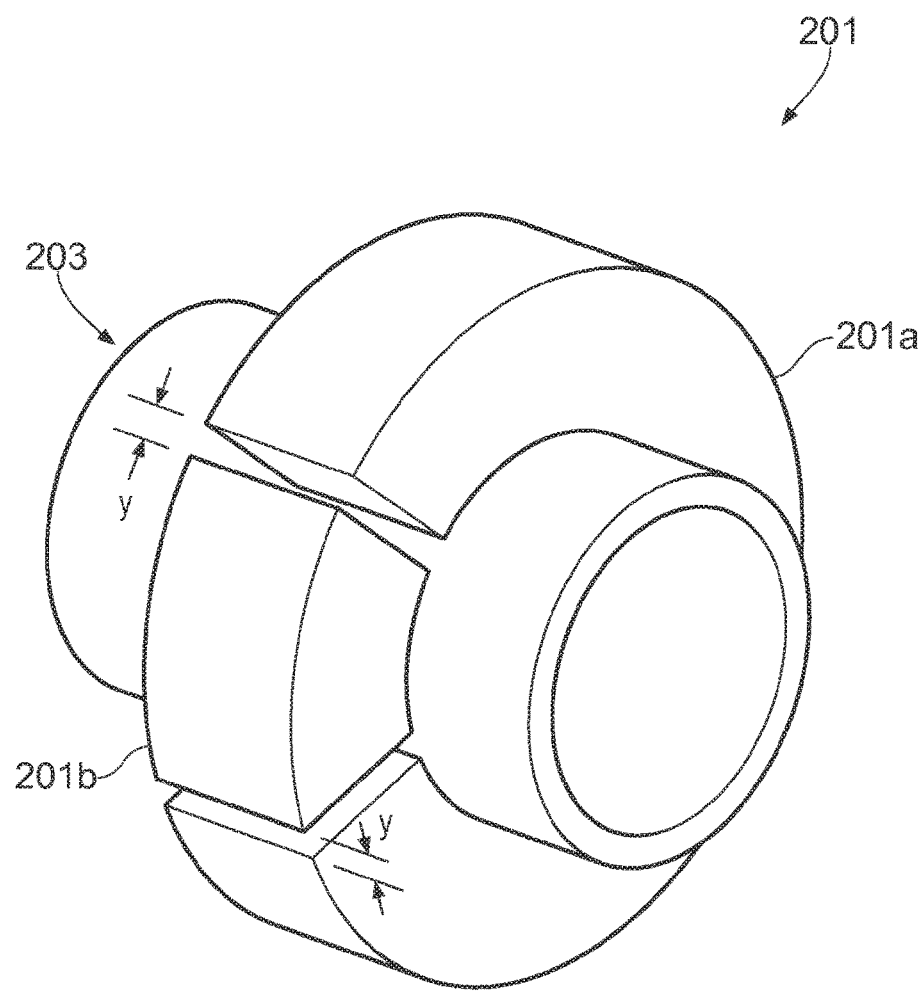
FIG. 2 is a schematic representation of a segmented transducer according to an example.

FIG. 2 is a schematic representation of a segmented transducer according to an example. A transducer 201 comprises two transducer portions or segments 201a-b. Parts 201a and 201b are separated from one another by gaps of width y. In common with the example shown in FIG. 1, in which the segments of the transducer 101 are separated by gaps of width x, it is possible that the width of the gaps between segments are different instead of being substantially equal as is depicted.

The transducer is mounted on a tube 203. As noted above, the tube 203 may be a flow tube of a flow meter for connection or use with an external circuit, or may be a selected part of a conduit of an external circuit that acts as the flow tube.

In the example of FIG. 2, no acoustic coupling material is present between the transducer 201 and the tube 203. For example, if the tube 203 is a flexible tube, such as PFA, an external resilient force may be used to ensure that acoustic coupling is maintained. For example, segment 201a can be in the form of an "open ring" of, say, 300° and segment 201b can be a 60° wedge, with clearance between the segments as depicted. The wedge portion can provide a retaining force to maintain an acoustic coupling between at least the segment 201a and the tube 203. Alternatively, or in addition, the inner profile of segment 201a can be selected so that it is slightly smaller than the circumference of the tube 203. Accordingly, when the tube is locally constricted, so it can be inserted into the segment 201a as shown, the segment will hold in place on the tube at the selected position as the tube returns to its original form. That is, the tube can be squashed into the opening of the segment, and when it returns to its original profile will frictionally hold in place as its outer surface comes into contact with the inner surface of the segment. In an example, the inner profile of the segment is selected to be small enough to enable the segment to be held in place on the tube whilst not provoking an irregularity in the flow of a liquid within the tube that would otherwise cause an error or inaccuracy in a measurement.

The degree to which the inner profile of a transducer is smaller than the corresponding outer profile a flow tube can depend on the type of flow tube being used. This can in turn depend on the nature of the external circuit for which fluid flow is to be determined. For example, if a portion of a conduit provides the flow tube of a flow meter, inasmuch as a transducer apparatus is introduced to that conduit for example, the inner profile of the transducers can be selected so as to conform to the dimensions of the conduit in order to hold it in place, whereby to cause the part of the conduit between transducers to form the flow tube of the apparatus.

As such, the amount of grip provided by the inner profile of a transducer will depend on the material of the conduit and/or flow tube in question. A relatively floppier tube will require a smaller inner profile for example in order to make sure that the transducers are able to hold in situ on the tube. In an example, the diameter of the inner profile of a segment can be in the region of 0.5-2.0 mm smaller than the outer diameter of a flow tube.

Accordingly, in the example that tube 203 is a flexible tube, it can be temporarily deformed to enable it to be squeezed into centre of the segment 201a, and then retained with the wedge by, for example, introducing the segment 201b to the surface of the tube 203 in the void defined by the segment 201a, and securing the segments using, for example, a clamping device such as a circular clamping device. This can provide a predetermined and constant acoustic coupling between the transducer 201 and the tube 203. In an example, the segments 201a-b may both be active, and as such they can be electrically connected using flexible connectors such as those used with and described with reference to FIG. 1. Accordingly, both segments can be excited simultaneously to provide an annular ultrasound signal into the tube 203.

Alternatively, only segment 201a can be excited. In this case, segment 201b may be composed of cheaper and more resilient material such as plastic or rubber for example. In an example, there may be no gap as such between segment 201a and a segment 201b. For example, segment 201b may deform, so that if there is any movement of segment 201a due to fluctuations in flow tube diameter for example, the movement is translated to deformation of segment 201b—that is, segment 201b may be caused to be 'squashed' to accommodate a change in pipe diameter, and may therefore, for example, temporarily bulge in any one or more dimensions that are otherwise not constrained by segment 201a or the flow tube.

Further alternatively, the segments may be simultaneously excited using separate connections to an electrical source. This may also be true for one or more of the segments of FIG. 1, and so flexible connectors between segment need not be provided in this case.

According to an example, segment 201a can be a single segment of substantially less than 180°. However, for optimum results as much of a full circle as possible is used to induce a signal.

Respective transducer portions of a transducer as described can be in the form of segments of a toroid formed using any suitable cross section. Segments of a toroid of rectangular or square cross section are depicted in FIGS. 1 and 2, although it will be appreciated that any suitable cross section could be used. In the examples of FIGS. 1 and 2, the inner profiles of the segment are selected to match the outer profile of the flow tube. Typically, this means that the inner profile is smooth and curved to maximise contact with the outer surface of a pipe or tube with circular cross-section, although it will be appreciated that any suitable profile can be selected in order to match the tube which is to be used.

Figure 3:
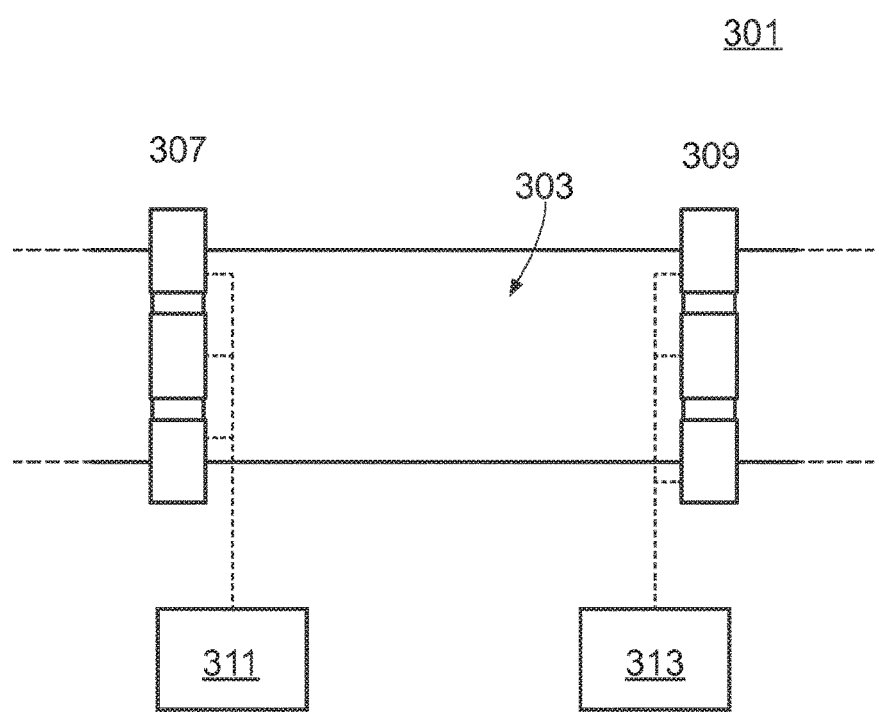
FIG. 3 is schematic representation of a transit time flow meter according to an example.

FIG. 3 is schematic representation of a transit time flow meter according to an example. The flowmeter, generally indicated 301, includes a flow tube generally indicated 303 which comprises a tube forming a central section having respective acoustic transducers 307, 309 at each end. In general, the flow tube may be substantially straight along its entire length between the transducers, but this is not essential and curved flow tubes may be utilised if the circumstances dictate. Preferably, however, there are no singularities (that is, no discontinuities, transitions or irregularities) in the flow tube or in the connections of the flow tube to an external circuit, or between the transducers and the flow tube which might cause a disruption in the fluid flow. For this reason the flow tube preferably has a constant transverse dimension along its length between the acoustic coupling means, although the transverse dimension of the tube at or to either side of the transducers may be different from that of the portion of the flow tube between the transducers. In addition, a small reduction in transverse dimension of the tube at the region of the transducers will not affect performance.

The flow meter 301 is operable to determine a flow rate of a fluid flowing in the flow tube 303 using a time difference between upstream and downstream acoustic transmissions. The transducers 307, 309 of the flow meter 301 are, according to an example, a pair of segmented transducers arranged in spaced relation on the flow tube 303. That is, respective ones of the segmented transducers 307, 309 include at least two transducer portions, such as the portions described above with reference to FIG. 1 or 2. At least one transducer portion for each of the transducers is an active transducer in an example.

In an example, a single driving circuit 311 can be connected to all active segments of transducers 307, 309 and is arranged to deliver energising signals thereto and, likewise, a single detection circuit 313 (which may integral with the circuit 311) is preferably connected to all active segments of transducers and is operable to process electrical signals generated by both transducers of the flow meter. This may be done in a time-shift multiplex mode, or may be done simultaneously. In this way, it is possible to determine the phase shift or time difference upon transit upstream and downstream.

The transducers 307, 309, the active segments of which can be piezoelectric acoustic segments for example, can be permanently fixed to the tube 303. For example, with reference to FIG. 1, an acoustic coupling, such as an adhesive, can be used to fix the segments of a transducer to the flow tube of the flow meter. Alternatively, segments can be fixed to a flow tube, including being releasably fixed using, for example, straps, clamps or other means (not shown). An acoustic coupling material (not shown) may be provided between the transducers and the flow tube to fill any air gaps and ensure a good acoustic connection between them. This material may be a mastic or plastic material capable of moulding itself to the shape of the mating surfaces when they are brought together for example.

As noted above, tube 303 may be part of a larger system within which a liquid flows. Accordingly, transducers 307 and 309 can be fitted to the tube portion 303 in order to define the flow meter 301. They may be permanently fixed, or releasably attached to the tube 303. For example, in situations where it would be undesirable to have a flow meter proper provided in-situ, perhaps due to safety, accessibility or weight constraints, it can be advantageous to enable the introduction of the transducers 307, 309 to a selected portion of a conduit of a system in order to enable flow rate measurements to be taken. The modules/circuits 311, 313 can be provided in a portable form to enable connection to the transducers. Further details of these modules are not described as they are well known in the art of transit-time differential flowmeters.

According to an example, the dimensions of the transducers and the segments of the transducers may be chosen in such a way as to achieve an appropriate resonant frequency when excited by an electric signal. The size of a transducer segment is selected to ensure that a sufficient contact area with the flow tube or an acoustic coupling medium or adhesive is achieved.

In an example, the flow tube may be substantially straight along its entire length between the transducers, but this is not essential and curved flow tubes may be utilised. Preferably, however, there are no singularities (discontinuities, transitions or irregularities) in the connections of the flow tube to an external circuit, or between the transducers or any acoustic coupling means or adhesive and the flow tube which might cause a disruption in the fluid flow. For this reason the flow tube preferably has a constant transverse dimension along its length between the acoustic coupling means, although the transverse dimension of the tube at or to either side of the region between the acoustic coupling means may be different from that of the portion of the flow tube between the acoustic coupling means. A convenient shape for the flow tube is one with a circular cross-section along its length. In an example, a flow tube can have a fixed cross-section along its length. For example, a rectangular flow tube with the segments being straight can be used.

In an example, flexible connections between portions of a transducer can be solder or wire. This will typically be flexible enough to cope with variations in a pipe diameter, which may be of the order of thousands of a centimeter for example. Although the variations are, relatively speaking, small, they are still enough to cause a transducer or an acoustic coupling between a transducer and a flow tube to fail, such as by cracking for example. For example, even a transducer that only partially extends around the outside of a flow tube, such as a transducer that goes around half of the tube for example, will be subject to tube diameter variations which can cause failure of the transducer or acoustic coupling, such as by cracking. Accordingly, providing a segmented transducer, even if that transducer extends only around a relatively small proportion of a flow tube, such as halfway around for example, is advantageous as it minimises the risk of damage to the transducer and/or acoustic couplings associated with variations in pipe diameter which may be caused by, for example, pressure changes of a fluid flowing within the flow tube. Other ways of providing a flexible connection between portions can be used. For example, brushes or flexible conductive bridges can be used.

Figure 4:
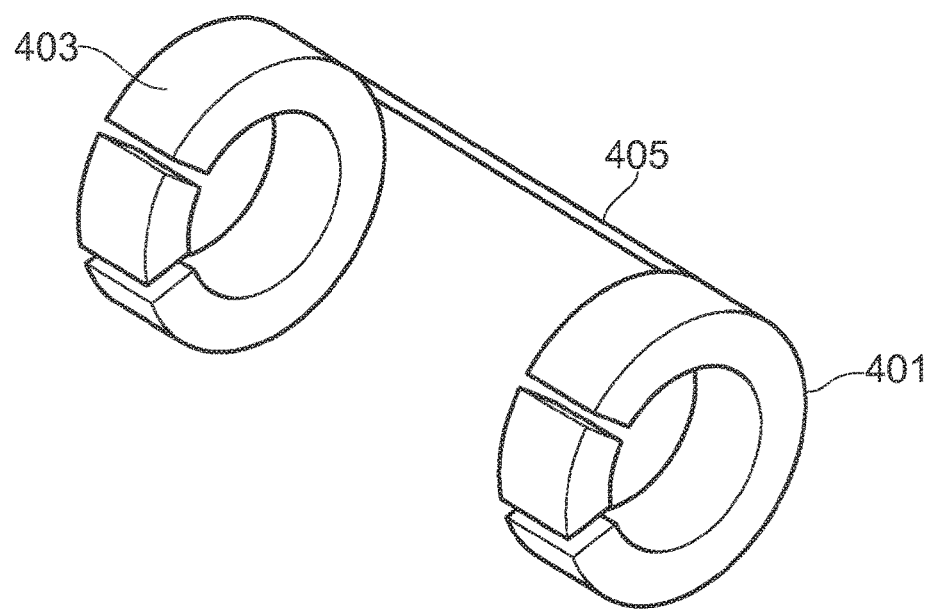
FIG. 4 is a schematic representation of a flow meter according to an example.

FIG. 4 is a schematic representation of a flow meter according to an example. In the example of FIG. 4, a portion of a flowmeter apparatus 400 comprises a pair of segmented transducers 401, 403 arranged in spaced relation to one another and held together in a mount 405. The apparatus 400 can be applied to an existing circuit in which a fluid is flowing in order to measure the flow rate of that fluid. In an example, the apparatus can be temporarily or permanently fixed to part of a conduit of the circuit, which then acts as a flow tube for a flow meter. Wedge portions of the transducers 401, 403 are depicted for illustrative purposes. The mount 405 can be a bar or brace holding the transducers together, or may be a more comprehensive framework into which the transducers fit. For example, a mount 405 can include housing portions into which portions of the transducers can be provided, such as by form-engagement, or by adhesion and so on. The housings can accommodate all or a portion of the or each transducer. The housing and/or brace/mount 405 can be made from metal, a plastics material or any suitable material. In the case of metal, the regions where the mount is joined or otherwise provided on the transducers may be electrically insulated.

Figure 5:
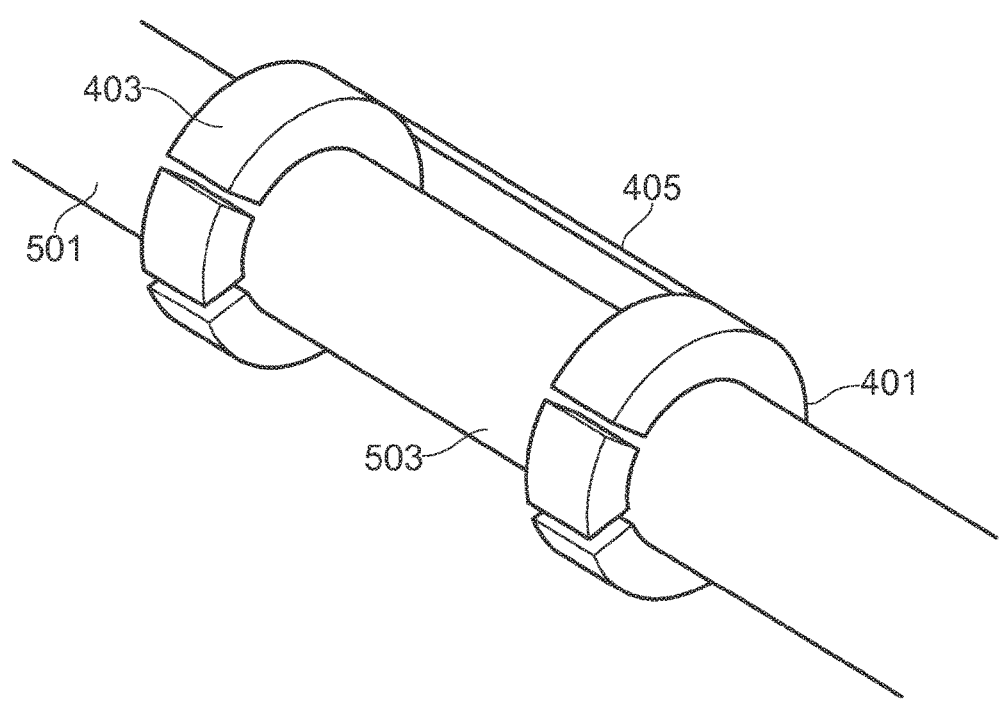
FIG. 5 is a schematic representation of an apparatus such as described with reference to FIG. 4 which is in situ on a conduit.

FIG. 5 shows an apparatus such as described with reference to FIG. 4 which is in situ on a conduit. As such, the part of the conduit 501 between the transducers 401, 403 acts as a flow tube 503 for the apparatus. A clamp may be placed around each of the transducer to keep the portions together and assist in maintaining the position of the transducers on the conduit 501. An acoustic coupling (not shown) may be used between the transducers and the conduit.

The transducers of an arrangement as shown in FIG. 4 or 5 may be transducers such as those described with reference to FIG. 2 for example. Accordingly, the transducers can be fitted around respective parts of a conduit of an external system. A wedge portion (201*b*) can then be provided to assist in preventing the conduit from coming out of the segment. That is, a conduit can be introduced into a gap in a transducer, and the gap can be filled, leaving gaps or interruptions as described above, by introducing the wedge portion into the gap through which the conduit has been passed. In an example, the wedge may be an active transducer portion, such as a piezoelectric crystal, in the same way the major portion (201*a*) is an active portion for the transducer. Alternatively, it may be a 'passive' portion, such as a wedge made from rubber or plastics material and so on, and therefore used only for plugging the hole in the active portion. This can be to assist in fixing a conduit in the active portion, and/or can be to provide an outer surface over the gap in the active portion over which a clamp of the like can be placed. That, is, an active transducer portion is a segment that can be energised, for example, in order to generate ultrasound, and which can be used to transduce a received ultrasound pulse or signal to an electrical signal. In this connection, a passive segment can be a portion that does not or cannot be energised or be used to transduce a received signal.

Figure 6:
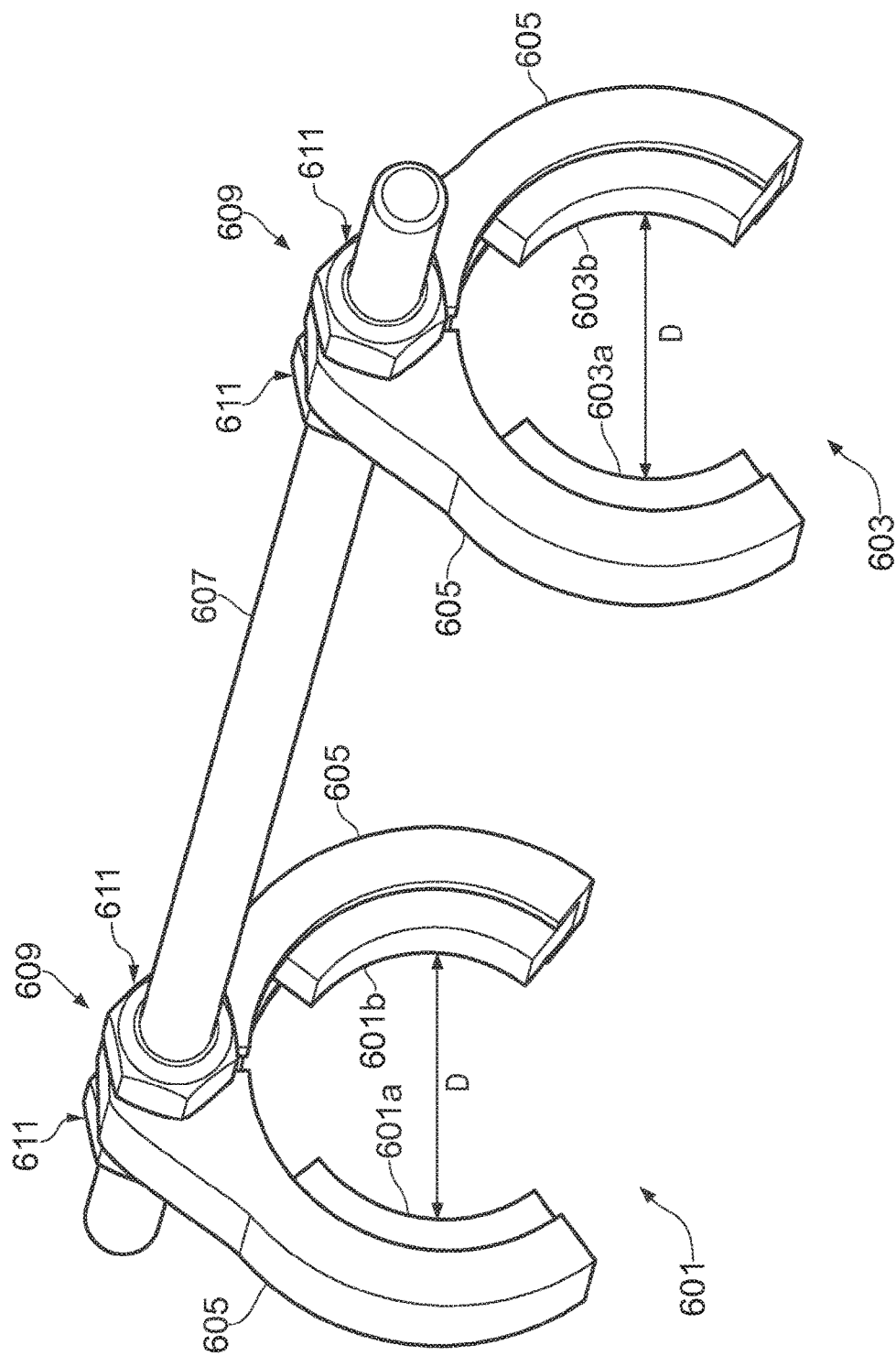
FIG. 6 is a schematic representation of a flow meter according to an example.

FIG. 6 is a schematic representation of a flow meter according to an example. In the example of FIG. 6, two segmented transducers 601, 603 are provided each comprising two transducer segments 601*a,b* and 603*a,b*. Each transducer portion is mounted on an adjustable arm 605 connected to a separating element 607, such a rod or bar for example. In an example, the arms 605 and/or element 607 can be polymer or other such suitable material. The arms may be so biased as to cause the respective segments of a transducer 601, 603 to grip a flow tube presented in between them. That is, for example, at the point 609 where the arms join the element 607, a spring or similar may be provided in order to load or bias the arms whereby to enable the arms to grip a tube. Alternatively, or in addition, the arms may be secured in a desired position relative to the element 607 using securing means 611 such as nuts that engage along a threaded portion (not shown) of the element 607. Further alternatively, the nature of the material used for the arms may be such as to provide a characteristic bias for the arms that obviates the need for any other biasing mechanism. This may also be used in addition to other means as noted above of course. Each arm for a transducer 601, 603 can be independently adjusted from the other arm of the same transducer. The inner face of a segment of a transducer can be so configured as to ensure a firm and acoustically optimal coupling to a flow tube. For example, as shown in FIG. 6, the inner face of a segment can be so profiled as to match the outer profile of a flow tube such that the inner face has no irregularly shaped portions or discontinuities. As noted above, an acoustic coupling medium may be used between the segments and a flow tube. Similarly to above, one or more of the segments for a transducer can be active.

The arms 605 are effectively clamps for the meter, and ensure good acoustic coupling to a flow tube. However, additional external clamping means (not shown) may also be used. As can be seen in FIG. 6, the segments of the transducers are separated by rather larger gap. However, the segments for a transducer 601, 603, when electrically connected or simultaneously activated, produce a plane wave. The size of the meter can be configured so that the plane wave produced has a wavelength which is larger than the diameter of a flow tube (that is, has a wavelength which is larger than dimension D, which is the maximum flow tube diameter). In an example, element 607 provides a fixed distance between the transducers. This can be useful as it can remove the need for calibration.

The invention claimed is:

1. A transit time flow meter apparatus for determining a flow rate of a flowing fluid using a time difference between upstream and downstream acoustic transmissions in the fluid, the flow meter including:
a pair of transducers arranged in spaced relation on a flow tube, wherein each of the transducers is segmented to include at least two portions,
wherein at least one of the two portions is an active transducer portion, and
wherein the active transducer portion is separated from each other portion of that transducer by one of an expansion gap or gaps, or wherein the active transducer portion is separate from each other portion of that transducer by a deformable element to enable fluctuations in a flow tube dimension to be accommodated without damage being caused to the active transducer portion.

2. A flow meter apparatus as claimed in claim 1, wherein the at least two portions of at least one of the pairs of segmented transducers are arranged on adjustable arms arranged, whereby to enable accommodation of flow tubes of varying diameter.

3. A flow meter apparatus as claimed in claim 1, wherein respective portions are so profiled as to match the outer profile of the flow tube.

4. A flow meter apparatus as claimed in claim 1, wherein respective portions are acoustically coupled to the flow tube.

5. A flow meter apparatus as claimed in claim 1, wherein respective portions are in the form of segments of a toroid formed using a rectangle or square.

6. A flow meter apparatus as claimed in claim 1, wherein respective ones of the segmented transducers comprise three portions, the innermost profile of each defining an arc subtending an angle of 120 degrees.

7. A flow meter apparatus as claimed in claim 1, wherein the flow tube is integral with the transducers and operable to be connected to an external circuit within which the fluid flows.

8. A transducer for a flow meter operable to determine a flow rate of a fluid flowing in a flow tube using a time difference between upstream and downstream acoustic transmissions in the fluid,
wherein the transducer is segmented to comprise at least two portions,
wherein at least one of the two portions is an active transducer portion, and
wherein the active transducer portion is separated from each other portion of the transducer by one of an expansion gap or gaps, or wherein the active transducer portion is separated from each other portion of the transducer by a deformable element to enable fluctuations in a flow tube dimension to be accommodated without damage being caused to the active transducer portion.

9. A transducer as claimed in claim 1, wherein the at least two portions are arranged in spaced relation to one another, whereby to provide a gap, break or interruption between the portions.

10. A transducer as claimed in claim 1, wherein respective portions are so profiled as to match the outer profile of the flow tube.

11. A transducer as claimed in claim 1, wherein respective portions are in the form of segments of a toroid formed using a square or rectangle.

12. A transducer as claimed in claim 1, wherein the transducer is a tri-partite transducer.

13. A transducer as claimed in claim 1, wherein one portion of the transducer is larger than at least one other of the portions.

14. A transducer as claimed in claim 1, wherein portions are spaced from one another by gaps of pre-selected widths.

15. A transducer as claimed in claim 1, wherein one of the portions is fabricated from a different material to at least one other of the portions.

16. A transducer as claimed in claim 1, wherein at least one portion is a rubber or plastics material.

17. A transducer as claimed in claim 1, wherein an inner profile of the transducer is smaller than a corresponding outer profile of a flow tube.

18. A transducer as claimed in claim 1, in which the inner profile is pre-selected in dependence on the use profile of the transducer.

19. A transducer as claimed in claim 1, wherein respective portions are so profiled as to match the outer profile of the flow tube.

* * * * *

UNITED STATES PATENT AND TRADEMARK OFFICE
CERTIFICATE OF CORRECTION

PATENT NO. : 10,365,137 B2
APPLICATION NO. : 15/543687
DATED : July 30, 2019
INVENTOR(S) : Trevor Forster Page 1 of 1

It is certified that error appears in the above-identified patent and that said Letters Patent is hereby corrected as shown below:

In the Claims

Column 12, Lines 17, 21, 24, 27, 29, 32, 34, 37, 39, 42 and 45, for the claim reference numeral "1", each occurrence, should read --8--.

Signed and Sealed this
Tenth Day of September, 2019

Andrei Iancu
*Director of the United States Patent and Trademark Office*